(12) United States Patent
Wang

(10) Patent No.: US 12,005,526 B2
(45) Date of Patent: Jun. 11, 2024

(54) EXHAUST GAS FILTER FOR REFLOW OVEN

(71) Applicant: Illinois Tool Works Inc., Glenview, IL (US)

(72) Inventor: Yuwei Wang, Suzhou (CN)

(73) Assignee: Illinois Tool Works Inc., Glenview, IL (US)

( * ) Notice: Subject to any disclaimer, the term of this patent is extended or adjusted under 35 U.S.C. 154(b) by 108 days.

(21) Appl. No.: 17/057,566

(22) PCT Filed: May 8, 2019

(86) PCT No.: PCT/US2019/031289
§ 371 (c)(1),
(2) Date: Nov. 20, 2020

(87) PCT Pub. No.: WO2019/217535
PCT Pub. Date: Nov. 14, 2019

(65) Prior Publication Data
US 2021/0205749 A1 Jul. 8, 2021

(51) Int. Cl.
*B23K 3/08* (2006.01)
*B01D 39/10* (2006.01)
(Continued)

(52) U.S. Cl.
CPC ............... *B23K 3/08* (2013.01); *B01D 39/10* (2013.01); *B01D 39/1692* (2013.01);
(Continued)

(58) Field of Classification Search
CPC ............... B01D 39/10; B01D 39/1692; B01D 46/0006; B01D 46/0041; B01D 46/10;
(Continued)

(56) References Cited

U.S. PATENT DOCUMENTS 5,641,341 A  6/1997 Heller
5,704,214 A  1/1998 Fujikawa
(Continued)

FOREIGN PATENT DOCUMENTS

CN   1894545    1/2007
CN   201334968  10/2009
(Continued)

OTHER PUBLICATIONS

Int'l Seach Report Appln No. PCT/US2019/031289 dated Jul. 24, 2019.
(Continued)

*Primary Examiner* — Gabriel E Gitman
(74) *Attorney, Agent, or Firm* — McAndrews, Held & Malloy, Ltd.

(57) ABSTRACT

An example exhaust gas filter for a reflow oven comprises a filter chamber, a filtering piece and a vapor chamber. An upper transverse passage is formed between the vapor chamber top plate and the filter element, a gap is formed between one side of the top plate and the sidewall of a filter chamber, and the upper transverse passage is in fluid communication with the gap; one filter chamber sidewall forming a gap with the top plate is disposed with a filter chamber air inlet for introducing air, and one of the other three sidewalls of the filter chamber is disposed with an exhaust gas inlet for introducing exhaust gas from the exhaust gas filter chamber, so that the air and the exhaust gas can enter the upper transverse passage through the gap.

15 Claims, 9 Drawing Sheets

A-A

(51) Int. Cl.
  *B01D 39/16* (2006.01)
  *B01D 46/00* (2022.01)
  *B01D 46/12* (2022.01)
  *B01D 46/42* (2006.01)
  *B01D 46/62* (2022.01)
  *B01D 53/00* (2006.01)
  *B01D 46/10* (2006.01)

(52) U.S. Cl.
  CPC ..... *B01D 46/0006* (2013.01); *B01D 46/0041* (2013.01); *B01D 46/12* (2013.01); *B01D 46/4218* (2013.01); *B01D 46/62* (2022.01); *B01D 53/002* (2013.01); *B01D 46/10* (2013.01); *B01D 2267/40* (2013.01)

(58) Field of Classification Search
  CPC .... B01D 46/12; B01D 46/4218; B01D 46/62; B01D 46/4263; B01D 46/88; B01D 53/00; B01D 53/002; B01D 2267/40; B01D 2257/708; B01D 2258/0216; B23K 1/0016; B23K 3/08; B23K 1/00; B23K 1/008; B23K 1/018; B23K 2101/42; B08B 15/00
  See application file for complete search history.

(56) References Cited

U.S. PATENT DOCUMENTS 6,120,585 A * 9/2000 Inomata ............... B23K 1/012
                                                96/377
2002/0178705 A1  12/2002  Mullins
2003/0205037 A1  11/2003  Mullins

FOREIGN PATENT DOCUMENTS

| CN | 204041286 | 12/2014 |
| CN | 105358911 | 2/2016 |
| CN | 105944494 | 9/2016 |
| CN | 206310899 | 7/2017 |
| CN | 206335223 | 7/2017 |
| CN | 107837668 | 3/2018 |
| EP | 0597136 A1 | 5/1994 |
| EP | 0898443 A1 | 2/1999 |
| JP | H0587987 | 4/1993 |
| JP | H0777346 A | 3/1995 |
| KR | 20090109269 A | 10/2009 |

OTHER PUBLICATIONS

Japanese Office Action ApplN No. 2020-562736 dated Apr. 24, 2023.

* cited by examiner

A-A

B-B

EXHAUST GAS FILTER FOR REFLOW OVEN

CROSS-REFERENCE TO RELATED APPLICATIONS

The present application is a national stage application under 35 U.S.C. § 371 of PCT Application Serial No. PCT/US2019/031289, filed on May 8, 2019, and entitled "Exhaust Gas Filter for Reflow Oven," and claims priority to Chinese Patent Application No. 201810437863.3, filed May 9, 2018. The entireties of PCT Application Serial No. PCT/US2019/031289 and Chinese Patent Application No. 201810437863.3 are incorporated herein by reference.

TECHNICAL FIELD

The present disclosure generally relates to exhaust gas treatment systems, especially exhaust gas filters used for reflow ovens.

BACKGROUND

In the fabrication of printed circuit boards (PCBs), electronic components are usually mounted to a PCB through a process called "reflow soldering". In a typical reflow process, solder paste (tin soldier) is deposited onto the selected areas of a PCB and one or more electronic components are wired to the deposited solder paste. The PCB is then passed through a reflow oven where the solder paste is reflow soldered (i.e., heated to a melting or reflow temperature) in a heated area and then cooled in a cooling area so that electronic components are electrically and mechanically wired to the PCB. The term "PCB" here covers substrate assemblies of any type of electronic components, e.g. wafer substrate. In a reflow oven, usually air or inert gases (e.g. nitrogen) are used as the soldering atmosphere, and different soldering atmospheres are used depending on PCBs with different process requirements. The reflow oven chamber is filled with soldering atmosphere, and the PCB is soldered in the soldering atmosphere as it is transported through the oven chamber on a conveyor.

Typically, solder pastes include not only solders but also fluxes that facilitate wetting of solders and provide good solder joints, as well as other additives such as solvents and catalysts. After the solder paste is deposited on the PCB, the PCB is transported on the conveyor through several heated areas of the reflow oven. The heat in the heated area melts the solder paste and vaporizes the flux in the solder paste and volatile organic compounds (referred to as "VOC") in other additives simultaneously to generate vapor. Such vapor is referred to as "volatile contaminants" below.

These volatile contaminants accumulate in the reflow oven, which can result in problems. If volatile contaminants reach the cooling area, they will condense on the PCB and contaminate it, making it necessary for the PCB to be subject to subsequent cleaning steps. Volatile contaminants can also condense on the surface of the cooler of the reflow oven and thus block the gas holes. Their condensates may also drip on the subsequent PCBs, thus damaging them or making it necessary for them to be subject to subsequent cleaning steps.

Therefore, the exhaust gas containing volatile contaminants must be discharged from the reflow oven in order to keep the soldering atmosphere in the reflow oven clean and prevent the volatile contaminants from causing the foresaid problems in the reflow oven. Usually, the discharged exhaust gas needs to be transported through the exhaust gas filter where the volatile contaminants contained in the exhaust gas are filtered and removed before the gas is discharged into the outside air.

SUMMARY

Rosin is the main component of the main volatile contaminants in the exhaust gas, with a freezing point of 110-130° C. The temperature of the gas discharged from the high temperature area of the reflow oven is usually higher than the freezing point of the rosin. In the existing exhaust gas filters, the exhaust gas that enters the exhaust gas filter through the high temperature area of the reflow oven is often discharged by the exhaust gas filter without being sufficiently cooled to a temperature below the freezing point of rosin. This leads to the failure of the rosin to condense completely into a solid, and part of the rosin is directly discharged into the atmosphere in the form of gas and thus causes pollution.

On the other hand, for the exhaust gas filter of the prior art, the exhaust gas filter and all the pipes attached to it must be disassembled and removed before the volatile contaminants accumulated inside the exhaust gas filter can be cleaned, which is troublesome.

In order to solve the above problems, it is the object of the present disclosure to provide an exhaust gas filter for a reflow oven, which allows sufficient cooling of the exhaust gas while facilitating disassembly and cleaning of the exhaust gas filter.

To achieve this object, the first aspect of the present disclosure provides an exhaust gas filter for a reflow oven, comprising:

a filter chamber—the filter chamber has a filter chamber top with an air outlet, and four sidewalls;

a filter element—the filter element is disposed inside the filter chamber and located below the air outlet;

a vapor chamber—the vapor chamber is disposed under the filter element and comprises a top plate;

wherein, an upper transverse passage is formed between the vapor chamber top plate and the filter element, and a gap is formed between one side of the top plate and one of the four sidewalls of the filter chamber, and the upper transverse passage is in fluid communication with and the gap;

wherein, an air inlet of filter chamber is disposed on the sidewall of the filter chamber which forms a gap with the top plate for introducing air, and an exhaust gas inlet of the filter chamber is disposed on one of the other three sidewalls of the filter chamber for introducing exhaust gas;

wherein, the air inlet and the exhaust gas inlet of the filter chamber are disposed in such a way that both air and exhaust gases can enter the upper transverse passage through the gap.

According to the first aspect mentioned above, the vapor chamber further includes a side plate which extends downward from an edge of the vapor chamber top plate;

wherein, a vertical passage is formed between the side plate and one of the four sidewalls of the filter chamber, and the upper transverse passage is in fluid communication with the vertical passage;

wherein, a filter chamber air inlet is disposed on the sidewall of the filter chamber which forms a vertical passage with the side plate for introducing air, and a filter chamber exhaust gas inlet is disposed on one of the other three sidewalls of the filter chamber for introducing exhaust gas;

wherein, the air inlet and the exhaust gas inlet of the filter chamber are disposed in such a way that both air and exhaust gases can enter the upper transverse passage through the vertical passage.

According to the first aspect mentioned above, the filter chamber exhaust gas inlet is located below the vapor chamber top plate.

According to the first aspect mentioned above, the filter chamber air inlet is located on a path on one side of the vertical passage.

According to the first aspect mentioned above, the filter chamber further includes a filter chamber bottom located opposite to the top of the filter chamber;

a lower transverse passage is formed between the vapor chamber top and the filter chamber bottom and is in communication with the vertical passage to enable exhaust gas to enter the vertical passage through it.

According to the first aspect mentioned above, the four sidewalls of the filter chamber are a front sidewall and a rear sidewall oppositely disposed, and a left sidewall and a right sidewall oppositely disposed. The air inlet of the filter chamber is disposed on the right sidewall of the filter chamber, and its exhaust gas inlet is disposed on the left sidewall.

According to the first aspect mentioned above, the exhaust gas filter further includes:

a left air inlet of the filter chamber, which is disposed on the left sidewall of the filter chamber and between the vapor chamber top plate and the filter element;

at least one gap disposed between the vapor chamber top plate and the left sidewall of the filter chamber.

According to the first aspect mentioned above, the exhaust gas filter further includes:

a rear air inlet of the filter chamber, which is disposed on the rear sidewall of the filter chamber and is in communication with the upper transverse passage.

According to the first aspect mentioned above, the exhaust gas filter further includes:

a front air inlet of the filter chamber, which is disposed on the front sidewall of the filter chamber and is in communication with the upper transverse passage; or a rear air inlet of the filter chamber, which is disposed on the rear sidewall of the filter chamber and is in communication with the upper transverse passage.

According to the first aspect mentioned above, the exhaust gas filter further includes:

an outer casing, into/from which the filter chamber can be inserted/withdrawn;

wherein, the outer casing is disposed with an air inlet and an exhaust inlet corresponding to the filter chamber, so that air and exhaust gas can enter the filter chamber through the outer casing.

According to the first aspect mentioned above, the outer casing comprises a rear sidewall, and a left sidewall and a right sidewall which are opposite to each other. An exhaust gas inlet is disposed on the left sidewall of the outer casing, and an air inlet is disposed on the right sidewall.

According to the first aspect mentioned above, the filter element comprises:

an upper filter element, which comprises a paper filter mesh;

a lower filter element, which comprises a metal filter mesh;

wherein the paper filter mesh and the metal filter mesh are aligned vertically.

According to the first aspect mentioned above, the filter chamber further includes:

two filter device mounting brackets, which are respectively connected to two opposite sidewalls of the filter chamber;

wherein, each filter device mounting bracket has a support for supporting the filter element;

wherein, the two filter device mounting brackets are disposed in such a way that when the filter element is mounted on it, there is a certain distance between the upper filter element and the top of the filter chamber.

According to the first aspect mentioned above, the filter device mounting bracket also includes a stop limit for stopping lateral movement of the filter element.

According to the first aspect mentioned above, the filter element further includes:

a springy tab, which is disposed on the top of the upper filter in such a way that the springy tab is located between the upper filter and the top of the filter chamber.

In the present disclosure, the vapor chamber enables the exhaust gas to fully mix with the air, so that the exhaust gas can be cooled more uniformly and drop below the freezing point of the rosin, thus better removing the volatile contaminants in the exhaust gas. Meanwhile, in the present disclosure, a slide fitted outer casing and a filter chamber are provided, which makes it easier to disassemble and clean the filter chamber.

DETAILED DESCRIPTION OF THE PREFERRED EMBODIMENTS

Figure 1A:
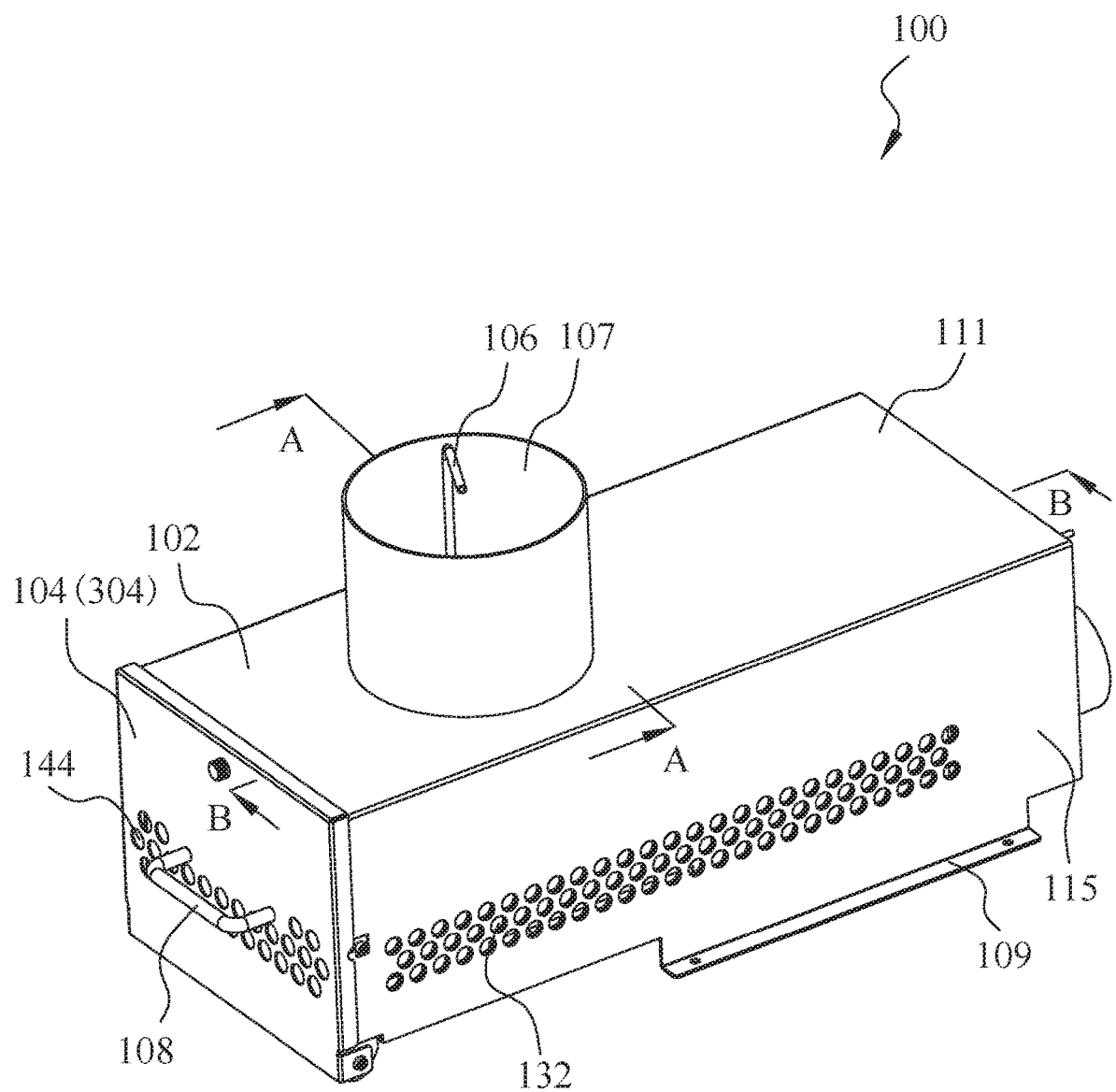
FIG. 1A is an elevation view of the exhaust gas filter described in the present disclosure.

Various embodiments of the present disclosure are described in detail below, with reference to the drawings which constitute a part of this specification. It should be understood that although terms referring to directions, such as "front", "rear", "upper", "lower", "left", "right", "top", "bottom", etc., are used in the present disclosure to describe various example structural parts and elements of the present disclosure, they are used herein for explanation only and are determined based on the example orientations shown in the drawings. As the embodiments disclosed in the present disclosure can be disposed in different directions, these directional terms are for illustration only and should not be taken as limitations. Wherever possible, the same or similar figure references used in the present disclosure refer to the same components.

Figure 1B:
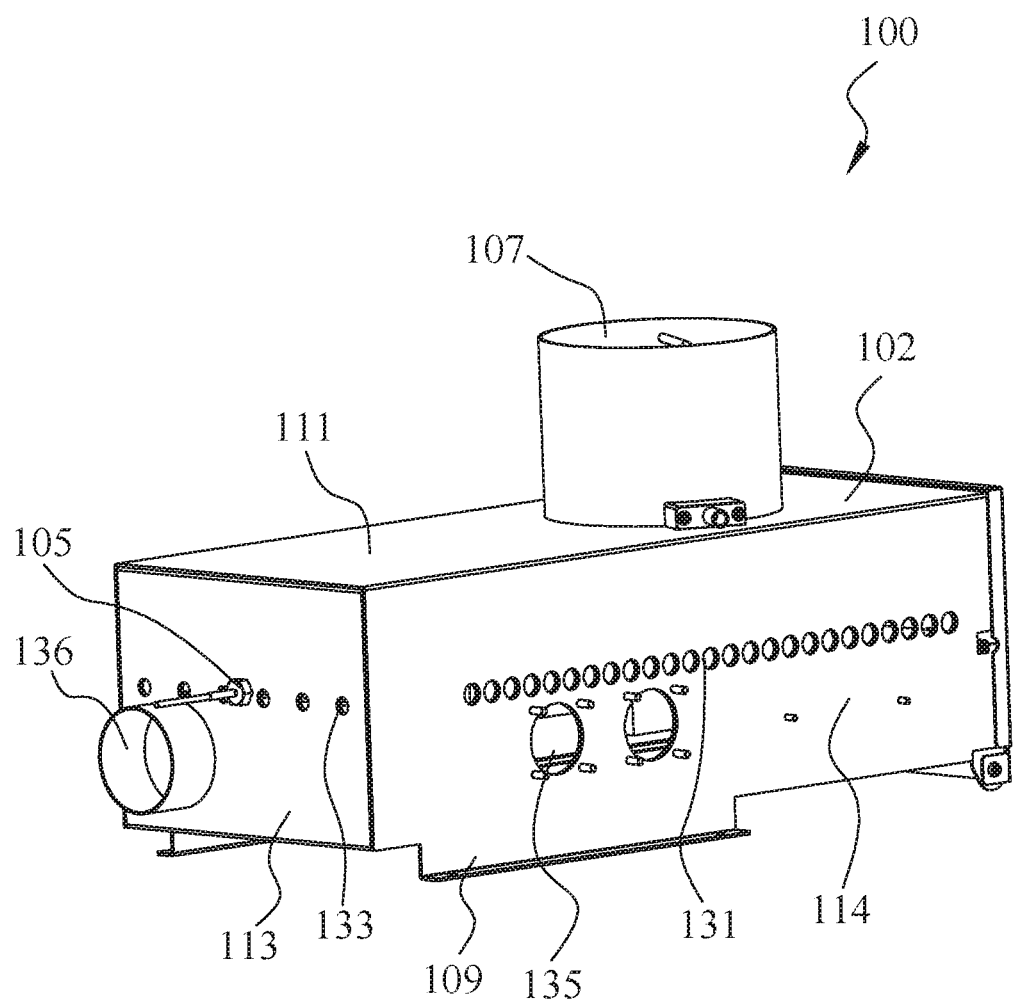
FIG. 1B is an elevation view of the exhaust gas filter shown in FIG. 1A from another angle.

FIGS. 1A and 1B are elevation views of the exhaust gas filter 100 of the present disclosure at front and rear angles. As shown in FIGS. 1A and 1B, the exhaust gas filter 100 comprises an outer casing 102 and a front sidewall 104. The outer casing 102 is generally of rectangular shape, comprising an outer casing top 111, an outer casing bottom 212 (see FIG. 2), a rear sidewall 113, a left sidewall 114, and a right sidewall 115. The front sidewall 104 is located on the front side of the outer casing 102 and disposed with a handle 108.

The outer casing 102 comprises a left exhaust gas inlet 135 and a rear exhaust gas inlet 136 disposed on the left sidewall 114 and the rear sidewall 113, respectively (as shown in FIG. 1B). Wherein, the exhaust gas inlet 135 on the left sidewall of the outer casing is used to connect with the air outlet in the middle of the reflow oven (i.e., the high temperature area), while the exhaust gas inlet 136 on the rear side of the outer casing is used to connect with the air outlets on both ends (i.e. low temperature area) of the reflow oven in such a way that the exhaust gas discharged from the high temperature area of the reflow oven enters the exhaust gas filter 100 through the left exhaust gas inlet 135 of the outer casing, and the exhaust gas discharged from the low temperature area of the reflow oven enters the exhaust gas filter 100 through the rear exhaust gas inlet 136 of the outer casing.

The outer casing 102 further includes a left air inlet 131, a right air inlet 132, a rear air inlet 133, and a front air inlet 144 which are disposed on the rear sidewall 113, the left sidewall 114, the right sidewall 115, and the front sidewall 104 of the outer casing, respectively. These air inlets can be formed by directly drilling a throughhole on each wall of the outer casing.

The outer casing 102 further includes an exhaust duct 107 connected to the top 111 of the outer casing for discharging gases from the exhaust gas filter 100. The exhaust duct 107 is connected to the ventilator through a pipe so that the gas in the exhaust gas filter 100 is discharged from the exhaust gas filter 100 from the inside to the outside. Furthermore, the ventilator is in communication with the outside so that the gas from the exhaust gas filter 100 can be discharged to the outside through the exhaust duct 107.

Figure 2:
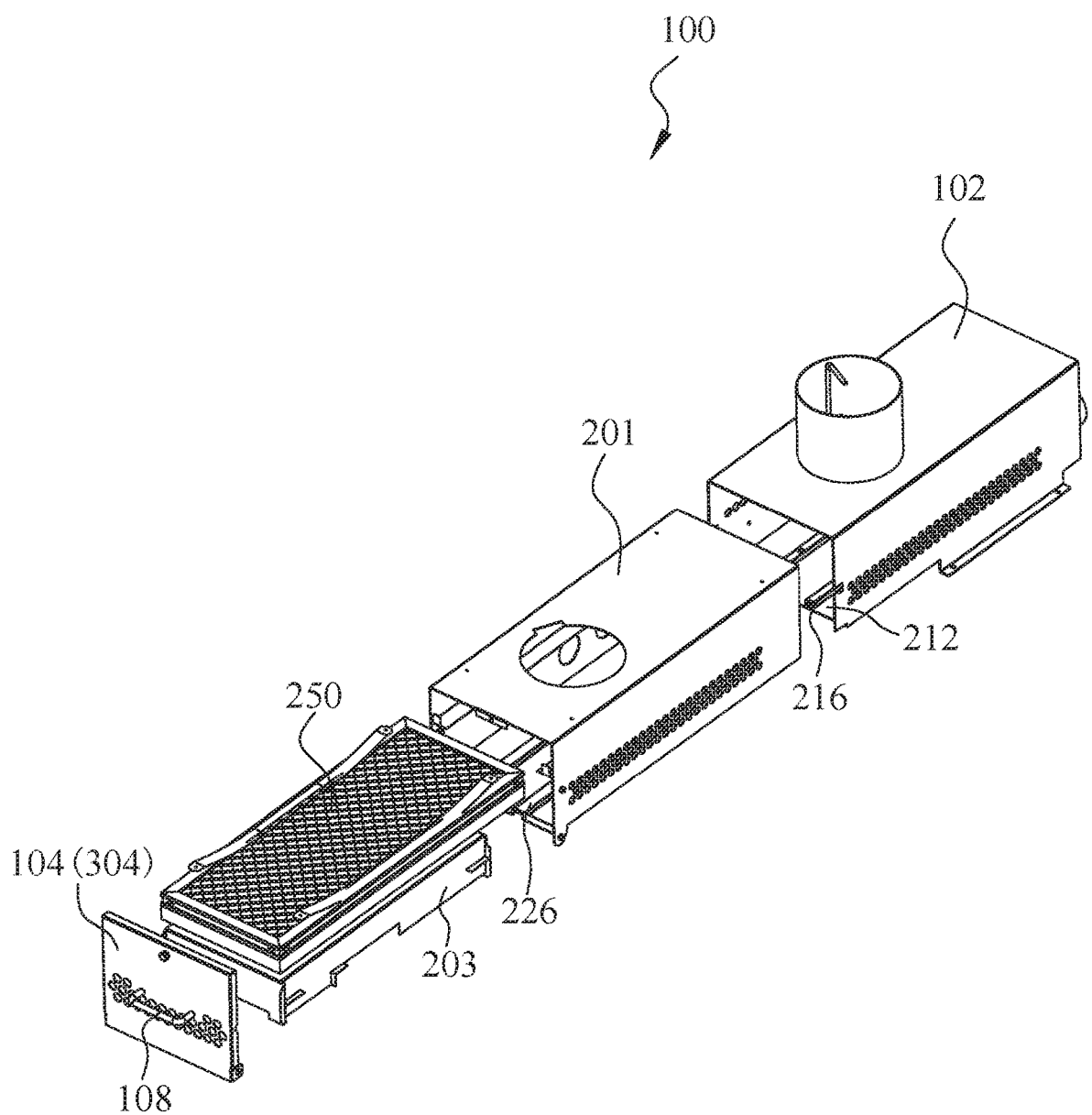
FIG. 2 is an exploded elevation view of the exhaust gas filter shown in FIG. 1A.

As a result, exhaust gas and air can enter the exhaust gas filter 100 from the exhaust gas inlet and the air inlet, respectively and are mixed in the exhaust gas filter 100, lowering the temperature of the exhaust gas and thus condensing contaminants in the exhaust gas, such as rosin. They are then filtered and removed by a filter 250 (as shown in FIG. 2) in the exhaust gas filter 100. Finally, the remaining mixture of exhaust gas and air is discharged to the outside from the exhaust duct 107.

It should be noted that a person skilled in the art may not provide two exhaust gas inlets but only the exhaust gas inlet 135 on the left side of the outer casing according to the treatment requirements of the exhaust gas of the reflow oven. Likewise, a person skilled in the art may not set up three air inlets but only one or two air inlets according to the treatment requirements of the exhaust gas of the reflow oven, and only needs to ensure that one of the air inlets is disposed on the right sidewall 115 of the outer casing opposite to the left exhaust gas inlet 135 of the outer casing. However, when the left sidewall 114 of the outer casing is disposed with both an exhaust gas inlet and an air inlet, the air inlet should be disposed above the exhaust gas inlet so that the exhaust gas can be mixed with the air above it when discharged from bottom to top. Likewise, when the rear sidewall 113 of the outer casing is disposed with both an exhaust gas inlet and an air inlet, the air inlet should also be disposed above the exhaust gas inlet. The exhaust gas inlet and the air inlet may be several holes disposed in rows.

The outer casing 102 further includes a fixing portion 109 for fixing and mounting the exhaust gas filter 100. In the embodiment shown in the present disclosure, the fixing portion 109 is a folded edge extending downward from the left sidewall 114 and the right sidewall 115 and bent horizontally for fixing the exhaust gas filter 100 horizontally. Other fixing structures are also possible in other embodiments.

The outer casing 102 further includes a temperature sensor 105 (shown in FIG. 1B) and a pressure sensor 106 (shown in FIG. 1A). The temperature sensor 105 is disposed on the rear sidewall 113 of the outer casing and extends into the exhaust gas filter 100 through the rear sidewall 113 of the outer casing for detecting the temperature of the gas in the exhaust gas filter 100. A pressure sensor 106 is disposed in the exhaust duct 107 for detecting the gas pressure at the exhaust duct 107.

FIG. 2 is an exploded view of the exhaust gas filter 100 shown in FIGS. 1A and 1B, which is used for illustrating components in the exhaust gas filter 100.

As shown in FIG. 2, in addition to the outer casing 102, the exhaust gas filter 100 further includes a filter chamber 201, a vapor chamber 203, and a filter element 250. Wherein, the filter chamber 201 can be inserted into and withdrawn from the outer casing 102 in the front-rear direction. To this end, the bottom 212 of the outer casing is disposed with a guide rail 216 extending in the front-rear direction for fitting with a guide groove 226 at the bottom of the filter chamber 201. Wherein, the filter chamber 201 is also disposed with an air outlet, an exhaust gas inlet and an air inlet (to be explained in FIG. 3), which are disposed respectively corresponding to the positions of the air outlet, the exhaust gas inlet and the air inlet on the outer casing 102, so that when the filter chamber 201 is inserted into the outer casing 102, the exhaust gas and the air can enter the filter chamber 201 through the exhaust gas inlet and the air inlet on the outer casing 102 and the filter chamber 201, and be discharged through the air outlets on the filter chamber 201 and the outer casing 102 after mixing and filtration. The vapor chamber 203 is disposed in the filter chamber 201 for sufficiently mixing the exhaust gas and the air in the exhaust gas filter 100 and performing heat exchange, thus reducing the temperature of the exhaust gas. A filter element 250 is also disposed in the filter chamber 201 and above the vapor chamber 203 for collecting the solid particles condensed in the exhaust gas.

Figure 3:
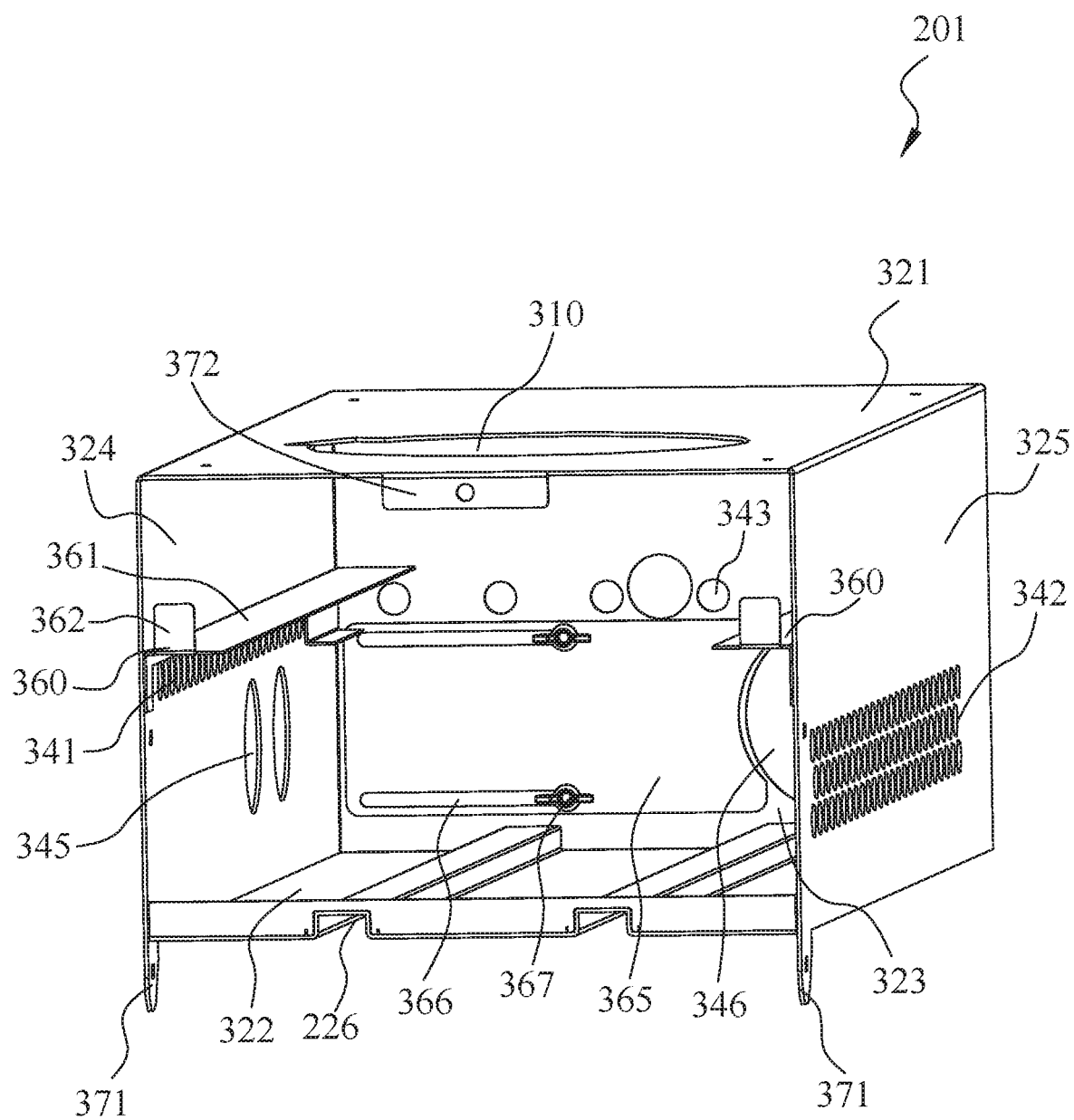
FIG. 3 is an elevation view of the filter chamber shown in FIG. 2.

FIG. 3 shows an elevation view of the filter chamber 201 in FIG. 2. As shown in FIG. 3, the filter chamber 201 is also generally of rectangular shape, and sized to match the size of the outer casing 102, so that the filter chamber 201 can be accommodated in the outer casing 102. The filter chamber 201 has a top 321, a bottom 322, a rear sidewall 323, a left sidewall 324, and a right sidewall 325. The front sidewall 104 is connected to the front side of the filter chamber 201, also constituting the front sidewall 304 of the filter chamber (not shown in FIG. 3). Since the front side 102 of the outer casing is open, when the filter chamber 201 is inserted into the outer casing 102, the front sidewall 304 of the filter chamber also serves as the front sidewall 104 of the entire exhaust gas filter 100. The left sidewall 324 and the rear sidewall 323 of the filter chamber are disposed with a left exhaust gas inlet 345 and a rear exhaust gas inlet 346 respectively. The rear sidewall 323, left sidewall 324 and right sidewall 325 of the filter chamber are respectively disposed with a rear air inlet 343, a left air inlet 341 and a right air inlet 342. An air outlet 310 is disposed at the top 321 of the filter chamber. When the filter chamber 201 is inserted into the outer casing 102, the left exhaust gas inlet 345 and the rear exhaust gas inlet 346 on the filter chamber 201 are aligned with the left exhaust gas inlet 135 and the rear exhaust gas inlet 136 on the outer casing 102, respectively; the rear air inlet 343, the left air inlet 341 and the right air inlet 342 on the filter chamber 201 are aligned with the rear air inlet 133, the left air inlet 131 and the right air inlet 132 on the outer casing 102 respectively; and the air outlet 310 on the filter chamber 201 is aligned with the exhaust duct 107 on the outer casing 102.

The inner sides of the left sidewall 324 and the right sidewall 325 of the filter chamber are respectively disposed with a filter element mounting bracket 360 for mounting the filter element 250 in the filter chamber 201. The filter mounting bracket 360 comprises a supporting part 361 and a stop limit 362. The supporting part 361 is an elongated plate, the right side of which is connected to the sidewall of the filter chamber, and the stop limit 362 is connected to the front end of the supporting part 361. The supporting part 361 of the filter mounting bracket 360 is used for supporting the filter element 250, and the stop limit 362 is used for stopping the filter element 250 installed in place from moving forward out of the filter chamber 201.

Still as shown in FIG. 3, the rear sidewall 323 of the filter chamber is also disposed with a baffle 365 which can be moved horizontally in the left-right direction. The position of the baffle 365 is approximately flush with the exhaust gas inlet 346 on the rear side of the filter chamber, so that the baffle 365 can partially block the exhaust gas inlet 346 on the rear side of the filter chamber when moving horizontally in the left-right direction, thereby adjusting the flow rate of exhaust gas. In the example shown in FIG. 3, the baffle 365 is disposed with a slide groove 366 extending in the horizontal direction; a latch 367 is connected to the rear sidewall 323 of the filter chamber, and the latch 367 is slide fitted with the slide groove 366. As the latch 367 is stationary, the baffle 365 can move horizontally along the direction in which the slide groove 366 extends.

The left and right ends of the front side at the bottom of the filter chamber 201 are respectively disposed with a clamp 371, and a mounting piece 372 is disposed in the middle of the front top of the filter chamber 101. The clamp 371 and the mounting piece 372 are used for connecting with the front sidewall 104 (as shown in FIGS. 1A and 2) to connect the front sidewall 104 onto the front side of the filter chamber 201. Thus, when a push-pull force is applied to the front sidewall 104 by the handle 108, the filter chamber 201 can be pushed and pulled.

The filter chamber bottom 322 is also disposed with a protrusion extending in the front-rear direction, and the protrusion forms a guide groove 226 on the lower surface of the filter chamber bottom 322. The guide groove 226 fits the guide rail 216 on the bottom 212 of the outer casing so that the filter chamber 201 can be inserted into the outer casing 102 in the front-rear direction.

Figure 4:
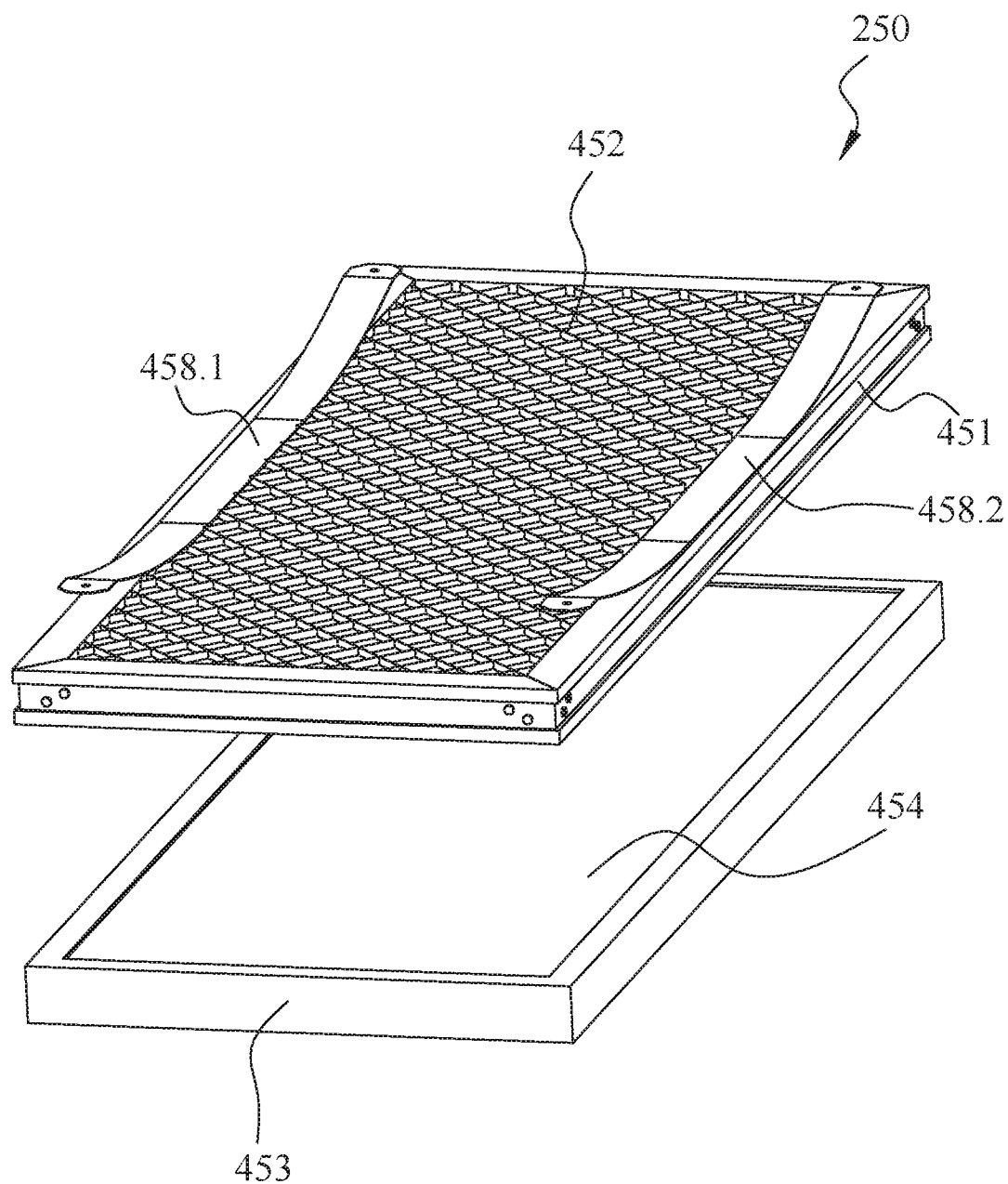
FIG. 4 is an exploded elevation view of the filter element shown in FIG. 2.

FIG. 4 shows an exploded elevation view of the filter element 250 in FIG. 2. As shown in FIG. 4, the filter element 250 comprises an upper filter element 451 and a lower filter 453, which are independent of each other. The upper filter element 451 comprises a paper filter mesh 452 with smaller pores, and the lower filter 453 comprises a metal filter mesh 454 with larger pores. The paper filter mesh 452 is aligned vertically with the metal filter mesh 454, so that most flux contaminants in the exhaust gas, such as rosin, are filtered out through the lower filter 453, and then the exhaust gas is further filtered through the upper filter element 451. The lower filter 453 can be cleaned and reused to save costs, while the upper filter 452 can be directly replaced as needed.

The upper filter element 451 further includes a springy tab 458 disposed on its top. The springy tab 458 comprises a springy tab 458.1 disposed on the left side of the upper filter element 451 and a springy tab 458.2 disposed on the right side of the upper filter element 451. The top ends on the front and rear sides of the springy tab 458 are free ends. The bottom end of the middle part of the springy tab 458 is connected to the upper filter 251.

Figure 5A:
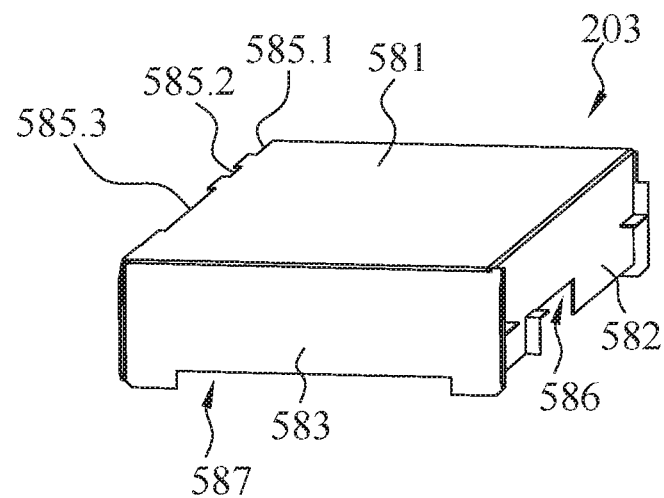
FIG. 5A is an elevation view of the vapor chamber shown in FIG. 2.
Figure 5B:
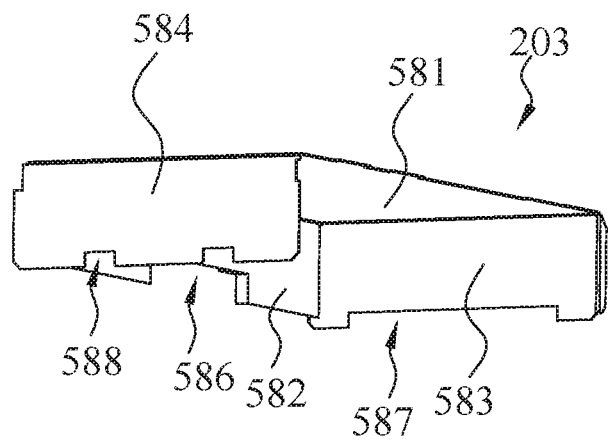
FIG. 5B is an elevation view of the vapor chamber shown in FIG. 5A from another angle.

FIGS. 5A and 5B show elevation views of the vapor chamber 203 in FIG. 2 at front and rear angles. As shown in FIGS. 5A and 5B, the vapor chamber 203 comprises a top plate 581, a side plate 582, a front end plate 583, and a rear end plate 584. Wherein, the side plate 582 is formed by extending downward from the right edge of the top plate 581 (the right side as shown in FIG. 5A), and the front end plate 583 and the rear end plate 584 are formed by extending downward from the edges of the front and rear ends of the top plate 581, respectively. The vapor chamber 203 can be made of a heat conductive material to enable better heat exchange between the exhaust gas and the air.

Figure 7:
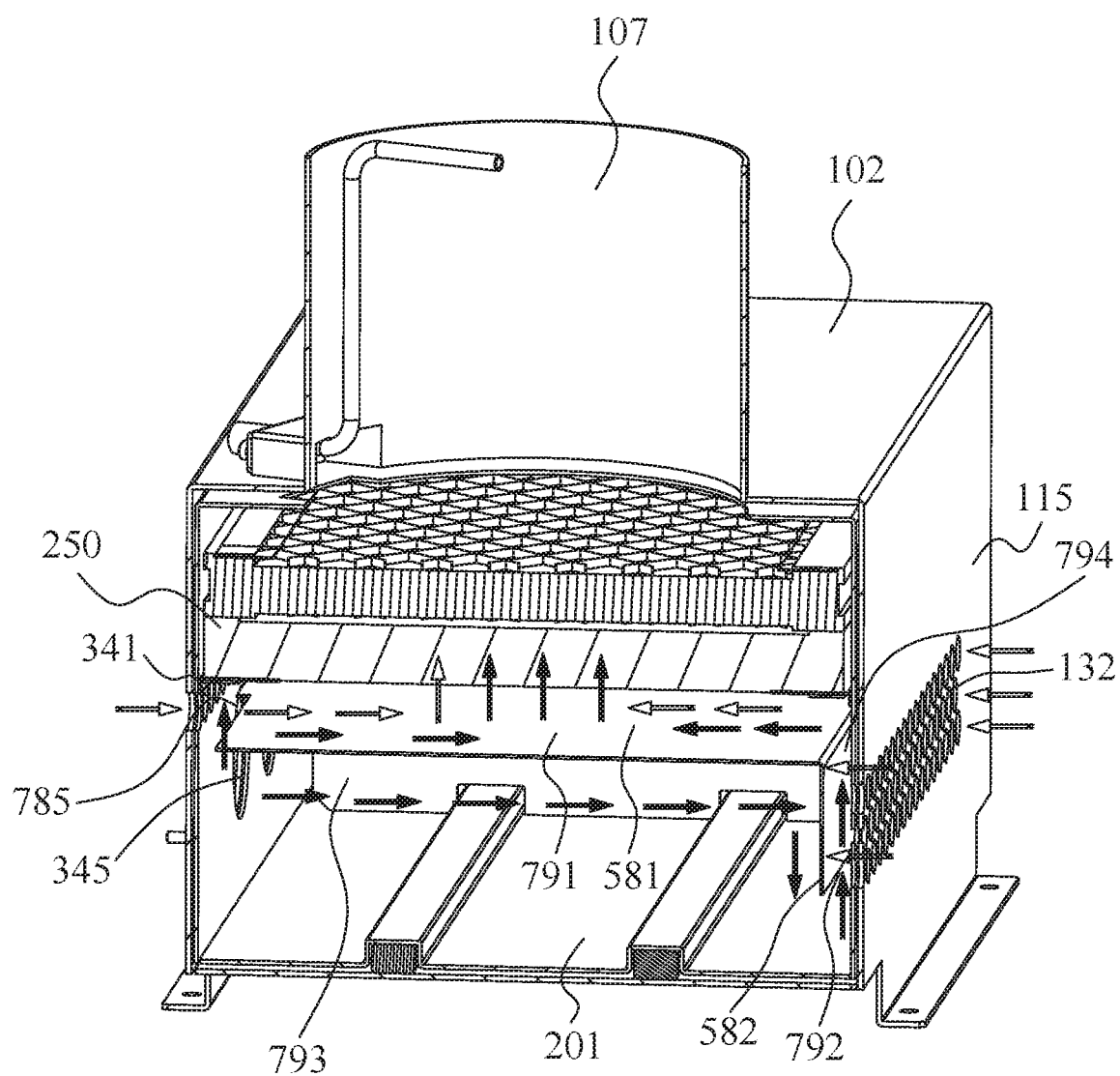
FIG. 7 is an elevation cross-sectional view of the exhaust gas filter shown in FIG. 1A along the direction shown in A-A.

Wherein, no side plates are disposed on the left side of the top plate 581, but a plurality of notches 585.1, 585.2 and 585.3 extending in the front-rear direction of the top plate are disposed on the left edge, so that when the vapor chamber 203 is located in the filter chamber 201, a gap 785 can be formed between the left edge of the top plate 581 and the sidewall of the filter chamber 201 (see FIG. 7). A front end plate opening 587 is disposed at a bottom edge of the front end plate 583, and a rear end plate opening 588 is also disposed at a bottom edge of the rear end plate 584.

Figure 5C:
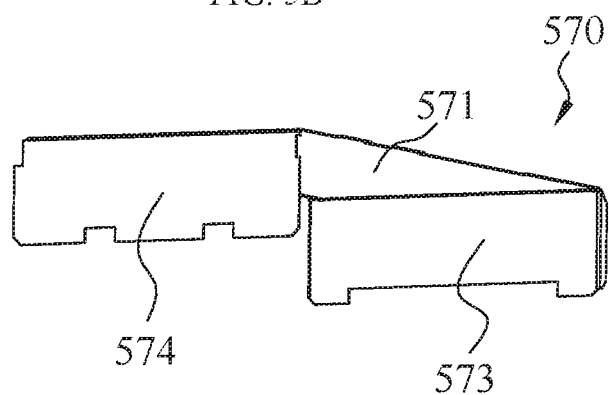
FIG. 5C is an elevation view of another embodiment of the vapor chamber.

FIG. 5C shows an elevation view of another example vapor chamber 570. Wherein, the vapor chamber 273 comprises the top plate 571, the front end plate 573, and the rear end plate 574 only, excluding the side plates. The structures of the top plate 571, the front end plate 573, and the rear end plate 574 are the same as those shown in FIGS. 5A and 5B.

Figure 6:
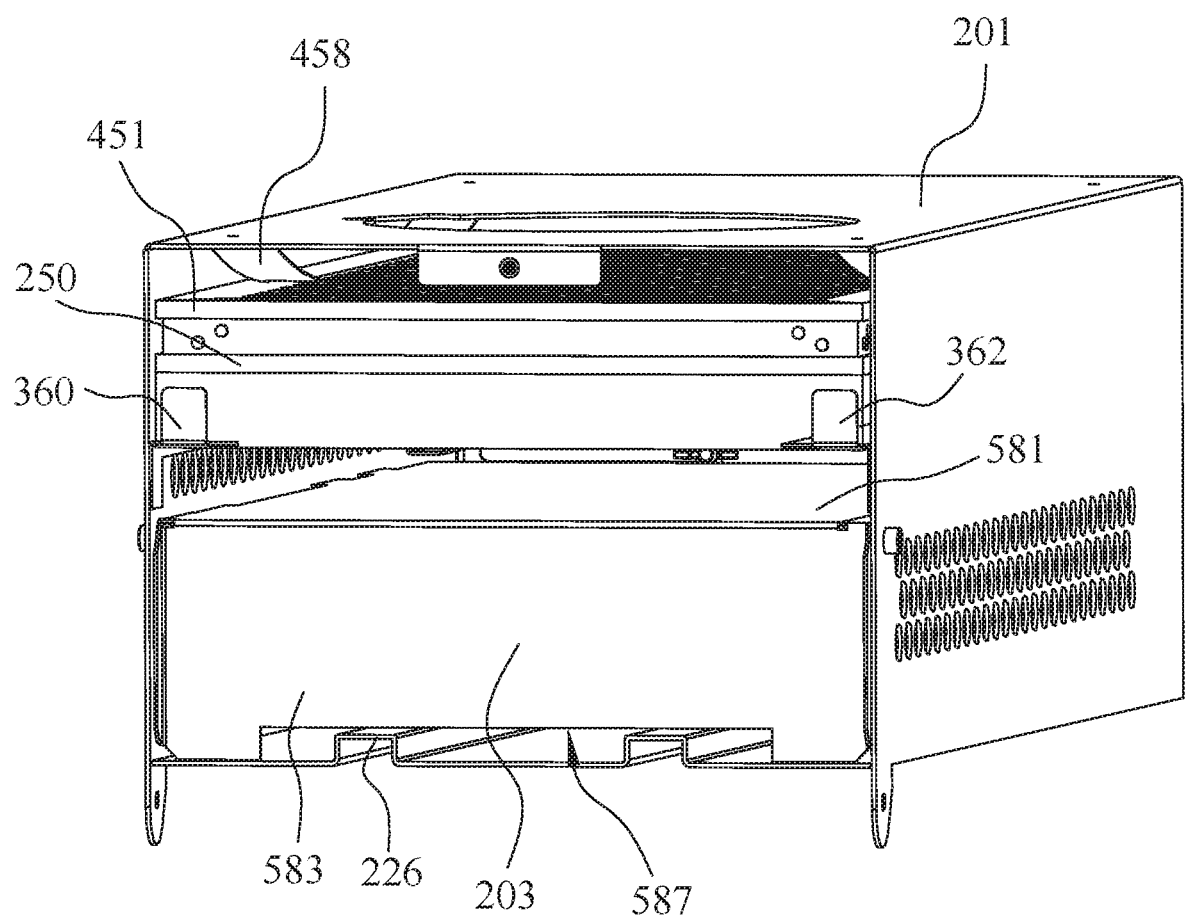
FIG. 6 is an elevation view of the filter element shown in FIG. 4 and the vapor chamber shown in FIG. 5A, 5B installed in the filter chamber shown in FIG. 3.

FIG. 6 shows an elevation view of the filter element 250 shown in FIG. 4 and the vapor chamber 203 shown in FIGS. 5A and 5B installed in the filter chamber 201 shown in FIG. 3. As shown in FIG. 6, when the filter element 250 and the vapor chamber 203 are installed in place in the filter chamber 201, the filter element 250 is positioned above the vapor chamber 203.

There is a certain gap between the upper filter element 451 and the top 321 of the filter chamber, so that the filter element 250 can be easily inserted into the filter chamber 201 during the installation process in the presence of the stop limit 362. And, as the upper filter element 451 comprises a paper filter mesh 452, the upper filter element 451 is relatively lighter. When there is a certain gap between the upper filter element 451 and the top 321 of the filter chamber, by arranging the springy tab 458 on the upper filter element 451, it is possible to prevent the air flow from driving the upper filter element 451 upward when the air is pumped from the air outlet 310. As can be seen from FIG. 6, when the filter element 250 is installed in place in the filter chamber 201, the springy tab 458 is in a compressed state with its top end abutting against the filter chamber top 321, thereby pressing the upper filter element 451 against the lower filter 453. Therefore, the elastic force of the springy tab 458 prevents the upper filter element 451 from easily moving up and down under the influence of air flow during operation, and prevents the upper filter element 451 from moving forward out of the filter chamber 201 during operation.

When it is necessary to install the filter element 250 in the filter chamber 201, the lower filter 453 is first inserted into the filter chamber 201 and supported on the supporting portion 361 of the filter mounting bracket 360 and stopped by the stop limit 362. Then, the upper filter element 451 is inserted, with a support by the lower filter 453. When it is necessary to remove the filter element 250 from the filter chamber 201, the upper filter element 451 is pushed upward to further compress the elastic compression piece 458, so that the upper filter element 451 is separated from the lower filter 453, and then the upper filter element 451 is pulled out. At last, the lower filter 453 is pushed upward to disengage the lower filter 453 from the stop range of the stop limit 462, so that the lower filter 453 can be moved forward and be pulled out.

Still as shown in FIG. 6, the vapor chamber 203 is installed in the filter chamber 201 by supporting the front end plate 583 and the rear end plate 584 of the vapor chamber 203 at the bottom 322 of the filter chamber 201. The front end plate opening 587 and the rear end plate opening 588 fit with the projected portion which forms a guide groove 226 on the bottom portion 322 of the filter chamber so that the vapor chamber 203 can be inserted into the filter chamber 201 in the front-rear direction. In the example shown, the front end plate opening 587 is disposed with a larger opening so that the operator can reach into the front end plate opening 587, which facilitates the removal of the vapor chamber 203.

The respective heights of the front end plate 583 and the rear end plate 584 of the vapor chamber 203 are set in such a way that when the vapor chamber 203 is installed in place in the filter chamber 201, the left air inlet 341 and the left exhaust gas inlet 345 of the filter chamber are located on the upper and lower sides of the top plate 581 of the vapor chamber, respectively (as shown in FIG. 7). The height range of the right air inlet 342 relative to the right sidewall 325 is approximately the same as that of the vapor chamber side plate 582 relative to the right sidewall 325, so that the air entering the right air inlet 342 can be blocked by the side plate 582 of the vapor chamber. As an example, the height of the side plate 582 may be slightly smaller than the respective heights of the front end plate 583 and the rear end plate 584, so that when the vapor chamber 203 is located in the filter chamber 201, there is a certain gap between the side plate 582 and the bottom 322 of the filter chamber 201, through which gas can flow, from one side of the side plate to the other side. In other embodiments, the side plate 582 may be disposed to be at the same height as the front end plate 583 and the rear end plate 584, while a side plate opening 586 is disposed on the side plate 582, enabling gases to flow from one side of the side plate to the other side. In the example shown, while a side plate opening 586 is disposed on the side plate 582, the side plate 582 is also disposed lower than the front end plate 583 and the rear end plate 584.

The width of the top plate 581 of the vapor chamber is set to be slightly smaller than the respective widths of the filter chamber top 321 and the filter chamber bottom 322, so that when the vapor chamber 203 is located in the filter chamber 201, a certain narrow gap 794 is left between the side plate 582 and the right sidewall 323 for gas to flow through (as shown in FIG. 7).

FIG. 7 is an elevation cross-sectional view of the exhaust gas filter 100 in FIG. 1A along the direction indicated by A-A, where solid arrows in the figure indicate the flow direction of exhaust gas and dashed arrows indicate the flow direction of the air. FIG. 7 shows the filtration process of exhaust gas discharged from the high temperature area of the reflow oven. The exhaust gas discharged from the high temperature area of the reflow oven enters the filter chamber 201 from the left exhaust gas inlet 135 of the outer casing and the left exhaust gas inlet 345 of the filter chamber.

As shown in FIG. 7, an upper transverse passage 791 is formed between the top plate 581 of the vapor chamber and the filter element 250, a vertical passage 792 is formed between the side plate 582 of the vapor chamber and the right sidewall 325 of the filter chamber, and a lower transverse passage 793 is formed between the top plate 581 of the vapor chamber and the filter chamber bottom 322. At least one gap 785 is formed between the left edge of the top plate 581 and the sidewall of the filter chamber 201.

When exhaust gas enters the filter chamber 201 from the left exhaust gas inlet 135 of the outer casing and the left exhaust gas inlet 345 of the filter chamber, a small amount of exhaust gas flows from below the top plate 581 of the vapor chamber, through the gap 785, and to the upper transverse passage 791 above the top plate 581 of the vapor chamber. Most exhaust gases flow from the left side of the vapor chamber 203 to the right side through the lower transverse passage 793 below the vapor chamber 203, pass through the side plate opening 586 of the vapor chamber side plate 582 and the gap between the vapor chamber side plate 582 and the bottom of the filter chamber 201, into the upper transverse passage 792, and then flow into the upper transverse passage 791 through the vertical passage 792 from bottom to top.

The air can enter the upper transverse passage 791 above the top plate 581 of the vapor chamber from the left air inlet 131 of the outer casing and the left air inlet 341 of the filter chamber. The air can also enter the vertical passage 792 of the filter chamber 201 from the right air inlet 132 of the outer casing and the right air inlet 342 of the filter chamber, and then mixes and heat exchanges with the exhaust gas in the vertical passage 792, and then flows into the upper transverse passage 791 with the exhaust gas. The vertical passage 792 is relatively narrow, which can make the exhaust gas and the air exchange heat more sufficiently and further reduces the temperature.

In the upper transverse passage 791, the air and the exhaust gas are further mixed for heat exchange, so that the temperature of the exhaust gas is further lowered. Then, the mixed gas of air and exhaust gas is filtered by the filter element 250 and discharged from the exhaust duct 107.

Certainly, it is possible that the vapor chamber does not comprise the side plate, and instead, uses the vapor chamber 570 as shown in FIG. 5C. In this case, the exhaust gas flows from the lower transverse passage 793 through the gap 794 to the upper transverse passage 791.

Figure 8:
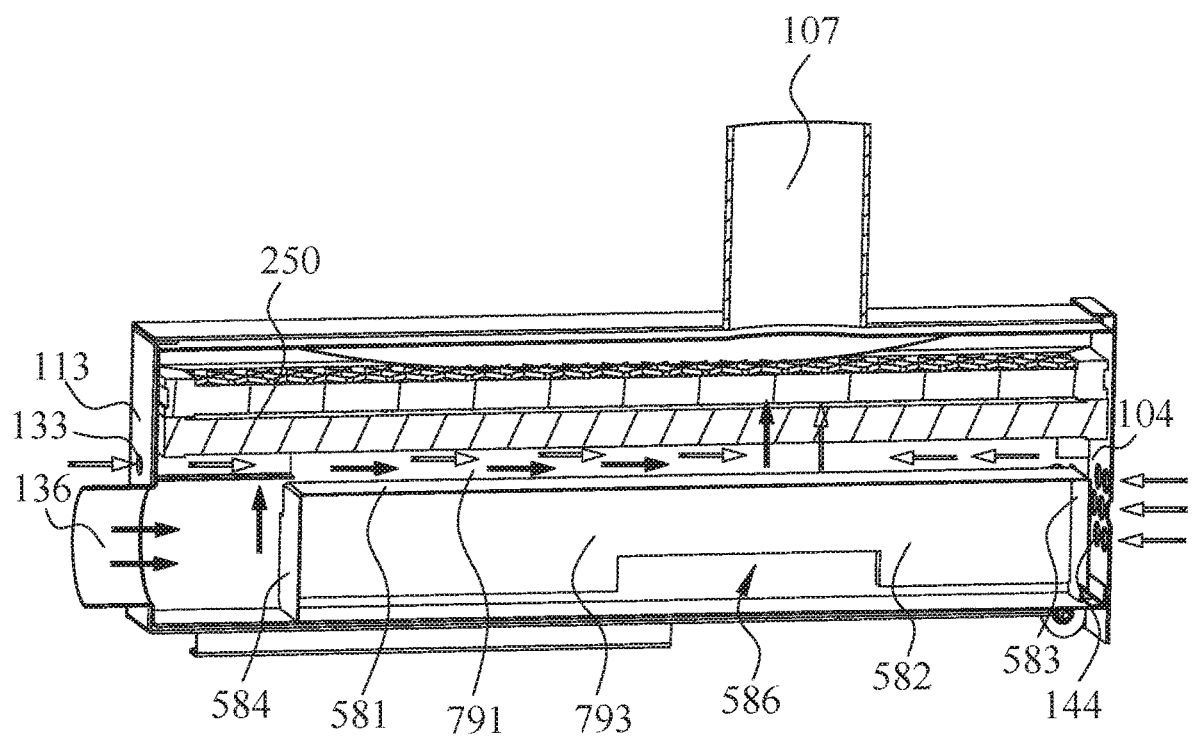
FIG. 8 is an elevation cross-sectional view of the exhaust gas filter shown in FIG. 1A along the direction in B-B.

FIG. 8 is a cross-sectional view of the exhaust gas filter 100 in FIG. 1A in the direction indicated in B-B, where solid arrows indicate the flow direction of exhaust gas and dashed arrows indicate the flow direction of the air. FIG. 8 shows the filtration process of exhaust gas discharged from the low temperature area of the reflow oven. The exhaust gas discharged from the low temperature area of the reflow oven enters the filter chamber 201 from the rear exhaust gas inlet 136 of the outer casing and the rear exhaust gas inlet 346 of the filter chamber.

As shown in FIG. 8, the exhaust gas enters the filter chamber 201 from the rear exhaust gas inlet 136 of the outer casing and the rear exhaust gas inlet 346 of the filter chamber, and is guided to the upper transverse passage 791 when it flows to the rear end plate 584 of the vapor chamber. The air enters the filter chamber 201 from the rear air inlet 133 of the outer casing and the rear air inlet 343 of the filter chamber, and directly enters the upper transverse passage 791 above the vapor chamber top plate 581. The air also enters the filter chamber 201 from the front air inlet 144 and is guided into the upper transverse passage 791 through the front end plate 583 of the vapor chamber. In the transverse passage 791, the exhaust gas is mixed with the air for heat exchange, so that the exhaust gas temperature is reduced and the exhaust gas filtered by the filter element 250 before it is discharged.

Since the exhaust gas that enters the filter chamber 201 from the rear side comes from the lower temperature areas at both ends of the reflow oven and is far away from the air outlet, it can be mixed and heat exchanged in the upper transverse passage 791, enabling the temperature of the exhaust gas in this area to be lowered to the required temperature.

Thus, the number of flow paths of the exhaust gas from the exhaust gas inlet to the exhaust duct 107 in the filter chamber 201 can be increased, and the air is introduced into the flow paths of the exhaust gas, which enables the mixing and heat exchange between the exhaust gas and the air to be more sufficient, and the temperature of the exhaust gas can be reduced to a greater extent.

The components for treating the exhaust gas are all in the filter chamber 201. Therefore, when it is necessary to clean the exhaust gas filter 100, it can be done by only pulling the filter chamber 201 out of the outer casing 102, and pulling the vapor chamber 203 and the filter element 250 out of the filter chamber 201 for cleaning. Therefore, the exhaust gas filter 100 of the present disclosure can not only effectively filter exhaust gas, but also facilitate cleaning.

Although the present disclosure is described with reference to the specific embodiments shown in the drawings, it should be understood that the exhaust gas filter in the present disclosure may have many variations without departing from the spirit taught in the present disclosure and its scope and background. General technicians skilled in the art will also realize that there are different ways to modify the arrangement in the embodiments disclosed in the present disclosure, which all fall within the spirit and scope of the present disclosure and the claims.

What is claimed is:

1. An exhaust gas filter for a reflow oven, comprising:
    a filter chamber, the filter chamber having a filter chamber top, the filter chamber top being provided with an air outlet, and the filter chamber having four sidewalls;
    a filter element, the filter element being disposed inside the filter chamber and located below the air outlet;
    a vapor chamber, the vapor chamber being disposed under the filter element and the vapor chamber comprising a top plate;
    wherein, an upper transverse passage is formed between the top plate of the vapor chamber and the filter element, a gap is formed between one side of the top plate and one of the four sidewalls of the filter chamber, and the upper transverse passage is in fluid communication with the gap;
    wherein, a filter chamber air inlet is provided on the one sidewall of the filter chamber which forms the gap with the top plate, the filter chamber air inlet is used for introducing air; and in the remaining three out of the four sidewalls of the filter chamber, one sidewall is provided with a filter chamber exhaust gas inlet, and the filter chamber exhaust gas inlet is used for introducing exhaust gas; and
    wherein, the filter chamber air inlet and the exhaust gas inlet of the filter chamber are disposed in such a way that both air and the exhaust gas can enter the upper transverse passage through the gap.

2. The exhaust gas filter of claim 1, wherein:
    the vapor chamber further includes a side plate, the side plate extending downward from an edge of the top plate of the vapor chamber;
    wherein the one sidewall of the filter chamber on which the filter chamber air inlet is provided forms the vertical passage with side plate, and the upper transverse passage is in fluid communication with the vertical passage; and
    wherein, the filter chamber air inlet and the exhaust gas inlet of the filter chamber are disposed in such a way that both air and the exhaust gas can enter the upper transverse passage through the vertical passage.

3. The exhaust gas filter of claim 2, wherein
    the filter chamber air inlet is located on a path on one side of the vertical passage.

4. The exhaust gas filter of claim 2, wherein the filter chamber further includes:
    a filter chamber bottom disposed opposite to the filter chamber top; and
    a lower transverse passage, which is formed between the top plate of the vapor chamber and the filter chamber bottom, the lower transverse passage being in communication with the vertical passage so that the exhaust gas can enter the vertical passage through the lower transverse passage.

5. The exhaust gas filter of claim 1, wherein
    the filter chamber exhaust gas inlet is located below the top plate of the vapor chamber.

6. The exhaust gas filter of claim 1, wherein
    the four sidewalls of the filter chamber comprise a front sidewall and a rear sidewall which are oppositely disposed, and a left sidewall and a right sidewall which are oppositely disposed; the filter chamber air inlet is a right air inlet disposed on the right sidewall of the filter chamber, and the exhaust gas inlet is a left exhaust gas inlet disposed on the left sidewall of the filter chamber.

7. The exhaust gas filter of claim 6, further comprising:
    a left air inlet of the filter chamber, the left air inlet of the filter chamber being disposed on the left sidewall of the filter chamber, and the left air inlet of the filter chamber being located between the top plate of the vapor chamber and the filter element; and
    wherein the gap is disposed between the top plate of the vapor chamber and the left sidewall of the filter chamber.

8. The exhaust gas filter of claim 6, further comprising:
    a rear exhaust gas inlet of the filter chamber, the rear exhaust gas inlet of the filter chamber being disposed on the rear sidewall of the filter chamber and being in communication with the upper transverse passage.

9. The exhaust gas filter of claim 8, further comprising at least one of:
    a front air inlet of the filter chamber, the front air inlet of the filter chamber being disposed on the front sidewall of the filter chamber and in communication with the upper transverse passage; or a rear air inlet of the filter chamber, the rear air inlet of the filter chamber being disposed on the rear sidewall of the filter chamber and in communication with the upper transverse passage.

10. The exhaust gas filter of claim 1, further comprising:
an outer casing, the filter chamber being able to insert into the outer casing or pull out of the outer casing;
wherein, the outer casing is provided with an outer casing air inlet and an outer casing exhaust gas inlet corresponding to the filter chamber, so that air and exhaust gas can enter the filter chamber through the outer casing.

11. The exhaust gas filter of claim 10, wherein
the outer casing comprises a rear sidewall, and a left sidewall and a right sidewall disposed opposite to each other, the left sidewall of the outer casing being provided with a left exhaust gas inlet, and the right sidewall of the outer casing being provided with a right air inlet.

12. The exhaust gas filter of claim 1, wherein the filter element comprises:
an upper filter, the upper filter comprising a paper filter mesh;
a lower filter, the lower filter comprising a metal filter mesh; and
wherein, the paper filter mesh and the metal filter mesh are vertically aligned.

13. The exhaust gas filter of claim 12, wherein the filter chamber comprises:
two filter mounting brackets, the two filter mounting brackets being respectively attached to two of the four sidewalls of the filter chamber, wherein the two sidewalls are opposite to each other;
wherein, each filter mounting bracket of the two filter mounting brackets comprises a supporting part, the supporting part being used for supporting the filter element;
wherein, the two filter mounting brackets are disposed in such a way that when the filter element is mounted on the filter mounting bracket, there is a certain distance between the upper filter and the filter chamber top.

14. The exhaust gas filter of claim 13, wherein each filter mounting bracket further includes:
a stop limit, the stop limit being used for blocking lateral movement of the filter element.

15. The exhaust gas filter of claim 12, wherein the filter element further includes:
a springy tab, the springy tab being disposed on the top of the upper filter in such a way that the springy tab is located between the upper filter and the filter chamber top.

* * * * *